United States Patent
Kay

(10) Patent No.: US 7,282,881 B2
(45) Date of Patent: Oct. 16, 2007

(54) POWER FOLD MIRROR CONTROL CIRCUIT AND METHOD

(75) Inventor: Donald Kay, Hilton (AU)

(73) Assignee: Schefenacker Vision Systems Australia Pty Ltd. (AU)

( * ) Notice: Subject to any disclaimer, the term of this patent is extended or adjusted under 35 U.S.C. 154(b) by 0 days.

(21) Appl. No.: 10/550,828

(22) PCT Filed: Mar. 25, 2004

(86) PCT No.: PCT/AU2004/000386

§ 371 (c)(1),
(2), (4) Date: Sep. 23, 2005

(87) PCT Pub. No.: WO2004/085206

PCT Pub. Date: Oct. 7, 2004

(65) Prior Publication Data

US 2006/0186682 A1    Aug. 24, 2006

(30) Foreign Application Priority Data

Mar. 25, 2003    (AU)   ............................. 2003901355

(51) Int. Cl.
*H02P 3/00*    (2006.01)

(52) U.S. Cl. ...................... 318/471; 318/434; 318/469; 318/474; 361/23; 359/873; 359/877

(58) Field of Classification Search ............... 318/474, 318/434, 430, 469, 641; 361/23, 106; 359/877
See application file for complete search history.

(56) References Cited

U.S. PATENT DOCUMENTS

| | | | |
|---|---|---|---|
| 4,683,515 A * | 7/1987 | Beihoff et al. | 361/106 |
| 5,514,940 A * | 5/1996 | Okamoto | 318/469 |
| 5,627,710 A | 5/1997 | Schoeffler | |
| 5,793,171 A * | 8/1998 | Hayashi et al. | 318/434 |
| 6,078,160 A * | 6/2000 | Cilluffo | 318/641 |
| 6,485,155 B1 * | 11/2002 | Duroux et al. | 359/877 |
| 6,813,886 B2 * | 11/2004 | Cerruti et al. | 60/527 |
| 6,838,850 B2 * | 1/2005 | Kurita et al. | 318/469 |
| 2003/0007266 A1 * | 1/2003 | Duroux et al. | 359/877 |
| 2003/0107340 A1 * | 6/2003 | Kurita et al. | 318/474 |
| 2004/0184170 A1 * | 9/2004 | Duroux et al. | 359/877 |
| 2005/0168853 A1 * | 8/2005 | Kyoden | 359/873 |
| 2006/0114625 A1 * | 6/2006 | Vermeulen et al. | 361/23 |
| 2006/0232896 A1 * | 10/2006 | Maue et al. | 361/23 |
| 2006/0256460 A1 * | 11/2006 | Duroux et al. | 359/877 |

FOREIGN PATENT DOCUMENTS

JP    2000211429    8/2000

* cited by examiner

*Primary Examiner*—Paul Ip

(57) ABSTRACT

A circuit and method of reducing the occurrence of overheating of a power fold vehicle mirror. The circuit controls the operation of the power fold mirror such that when a portion of the circuit reaches or exceeds a predetermined temperature threshold, the vehicle mirror is prevented from at least folding in. In practice, the vehicle mirror will be allowed to fold out even when the predetermined temperature threshold has been reached or exceeded, to allow the vehicle door to be opened and the car to be driven. The vehicle mirror may be allowed to be folded in when the temperature of the circuit falls to or below a second predetermined temperature threshold.

5 Claims, 1 Drawing Sheet

POWER FOLD MIRROR CONTROL CIRCUIT AND METHOD

CROSS-REFERENCE TO RELATED APPLICATIONS

This application is a National Stage of International Application No. PCT/AU2004/000386 filed Mar. 25, 2004, which claims priority to Australian Patent Application No. 2003901355 filed on Mar. 25, 2003. The disclosures of the above applications are incorporated herein by reference.

TECHNICAL FIELD

This invention relates to the control of power fold mirrors on vehicles.

BACKGROUND OF THE INVENTION

A standard feature of many modern vehicles, including private and industrial vehicles, is the ability for one or more side mirrors of the vehicle to fold in and out from the side of the vehicle. The driver is able to manually control the position of the mirror such that, when, for example the car is parked, the driver will switch the mirror into a folded position to lie adjacent to the external surface of the car. When the car is about to be driven, the driver can select the fold out position and the mirror will fold out from the side of the car and assume an extended position in the normal fashion, to allow the mirror to be used while driving.

A common factor to be taken into consideration when designing electronic circuits, particularly when associated with mechanical actuators, is the production of heat. In the case of fold out mirrors, small electric motors drive the movement of the mirror and in doing so, generate heat. Traditionally, because the power fold function is used infrequently, the generation of heat is not a major problem. However, there may be instances where the power fold function is used frivolously, for example a child playing with the power fold switch and repeatedly folding the mirror in and out. This may result in overheating of the motor and surrounding electronic components and may damage the components of the mirror system.

Traditional ways of dealing with overheating include the provision of heat sinks, which provide a large surface area in contact with the surrounding air to radiate heat therefrom, and in the case of circuit boards, larger PCBs can be used to provide the larger heat radiating area.

Other methods of compensating for the generation of heat include using heavier duty components which are more expensive. This is undesirable in a product which is mass manufactured as the overall increase in cost can be dramatic. Similarly, in devices such as power fold control circuits, space is often at a premium and it is necessary to keep component and board sizes as small as possible.

It is an object of the present invention to provide an alternative means of addressing the problem of potentially damaging heat.

SUMMARY OF THE INVENTION

According to a first aspect of the present invention, there is provided a control circuit for controlling the operation of a power fold vehicle mirror, the control circuit including:
 a temperature sensor; and
 a vehicle mirror actuation control; wherein
 upon the temperature sensor sensing that a temperature of at least a portion of the control circuit has reached or exceeded a predetermined temperature threshold, the vehicle mirror actuation control prevents the vehicle mirror from at least folding in.

According to a second aspect of the present invention, there is provided a method of controlling the operation of a power fold vehicle mirror, controlled by a control circuit, the method including preventing the vehicle mirror from at least folding in if a temperature of at least a portion of the control circuit reaches or exceeds a predetermined temperature threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

A preferred embodiment of the present invention will now be described with reference to the following Figures in which.

DETAILED DESCRIPTION OF THE PREFERRED EMBODIMENT

Figure 1:
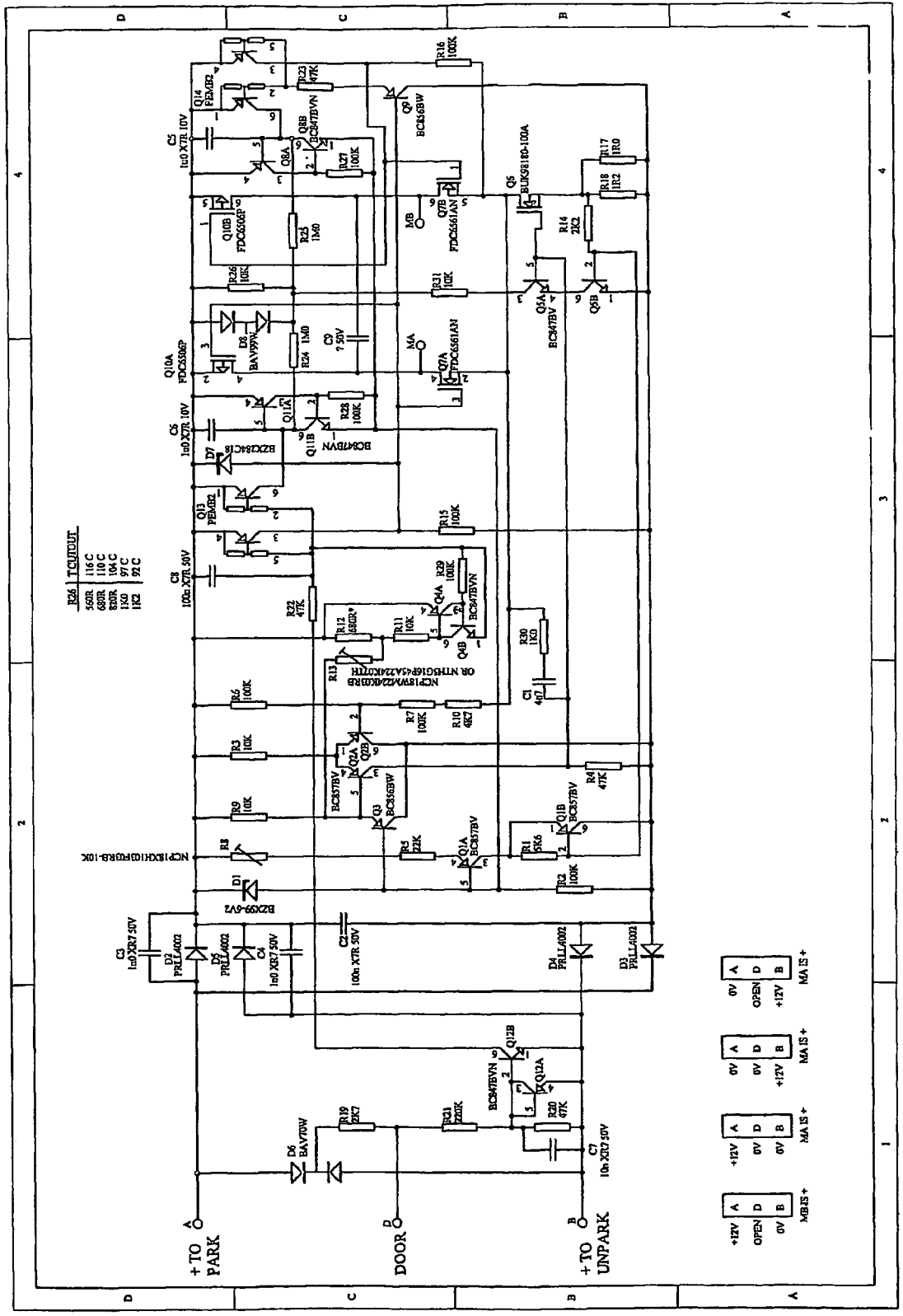
FIG. 1 is a circuit diagram including a control circuit according to the present invention.

FIG. 1 shows a circuit diagram of a control circuit for controlling the operation of a power fold mirror.

The vehicle interface has two supply leads (A and B) and a door signal line (D). When door signal line D is open circuit, the motor polarity is determined by the supply polarity. Door signal D equates to the state of the vehicle door. A and B are provided by the state of a "fold in/fold out" control switch, operated by a user.

When door signal line D is connected to the negative supply lead, then the polarity of A and B have no effect on the motor polarity. The motor polarity is shown in Table 1 below, where A, D and B are the inputs described above and MA and MB are the terminals of the motor. The "function" column indicates the function of the mirror resulting from the combination of the signals on inputs A, D and B.

TABLE 1

| Input | | | Output | | |
|---|---|---|---|---|---|
| A | D | B | MA | MB | Function |
| + | Open | − | − | + | Fold In |
| − | Open | + | + | − | Fold Out |
| − | − | + | + | − | Fold Out |
| + | − | − | + | − | Fold Out |

Door signal line D input is supplied with a positive bias current from R19 via D6 from whichever of A or B is positive. From Table 1, it can be seen that the function is always "fold out" unless A is positive, D is open and B is negative. In order to select "fold in", digital transistors Q13 must be biased on. This occurs only when Q12 is biased on which can only occur if B is negative and D is open. In this case, a current flows from D6 to R19 to R21, to bias Q12B on and draw current through R22 which biases digital transistors Q13 on. If D is negative, then Q12B cannot be biased on and if B is positive, Q12B cannot draw current through R22 to bias Q13 on. Thus, Q13 is biased on only when the "fold in" function is required.

It will be appreciated that the mirror should not be able to fold in if the vehicle door is open, as this will interfere with the operation of the mirror.

Transistor Q12A is used to protect the junction of Q12B from excessive reverse bias voltage. Capacitor C7 provides immunity from high frequency interference and R20 provides immunity from RF and small leakage currents on the D input line. Capacitor C8 is provided to prevent changes to the input states that only last a short time from changing the function of the device. Diodes D2 to D5 form a conventional full wave rectifier circuit. Capacitor C2 is used to bias the circuit during supply interruptions, reducing interfering signals from the motor being transmitted to the vehicle interface leads and improve the input impulse transient immunity. While the vehicle interface is energised, the cathode of diode D2 is positive and anode of diode D3 is negative, regardless of the polarity of the incoming supply signal.

Capacitors C3 and C4 connect the input to the output of the rectifying circuits or bridge, for high frequencies even when none of the diodes is positively biased. This reduces EMC emissions and susceptibility.

Transistors Q10 and Q7 form a conventional H bridge allowing polarity control. When transistor Q13 is on, transistor Q7A is on making the motor input terminal MA negative. Q13, being on, also biases Q10A off and Q14 off (via Q9 and R23). Transistor Q14 is biased off, allowing R16 to bias Q10B on and Q7B off, making motor terminal MB positive. When Q13 is off, all of the above states are reversed and motor terminal MA is positive and motor terminal MB is negative.

Capacitor C9 reduces the interference produced by the motor passing through the circuit to the vehicle interface. Diode D7 prevents transients on the supply from damaging transistors Q7A and Q10A via R15.

Diode D1, biased by R2, provides a voltage reference, which may be shunted off by either of the SCR-configured transistor pairs Q11A with Q11B and Q8A with Q8B (the function of which will be discussed further below). Transistor Q3 and resistor R9 buffer the voltage regulator output.

Transistors Q2A with Q2B form a voltage comparator of the "long tail pair" variety, biased by R3. The current provided by R3 is steered in varying proportions between the collector of transistor Q2B to supply return or to the collector of transistor Q2A, generating a voltage on R4.

The input of the comparator is fed with the voltage reference on one side and with a percentage of the voltage supplied to the output polarity control circuit (incorporating transistors Q10 and Q7 as described above) by the ratiometric potential divider made up by resistors R7, R10 and R6.

The output of the comparator (being the voltage developed across resistor R4) controls the bias of transistor Q6, which forms the voltage regulator pass element.

Capacitor C1 and resistor R30 control the gain roll-off and phase of the loop to prevent oscillation of the circuit.

The voltage of the output polarity control circuit and hence the output to the motor is thus voltage regulated to a multiple of the referenced voltage.

The current through the output terminals, the output polarity control circuit and the voltage regulator, flows through current sense resistors R17 and R18, generating a voltage feeding resistor R14, proportional to the current. This voltage is summed with the voltage produced by a current from R1 acting on R14. This current is introduced to modify the voltage produced by the current according to the temperature of the circuit. Applying the reference voltage as described above to the series combination of resistors R5 and R8 creates the current. Resistor R8 has a high and non-linear defined negative temperature coefficient of resistance to temperature (otherwise known as a thermistor). The current this produces increases with temperature. Given that the base current of transistor Q1A is small, the emitter current and collector current are approximately equal. This additional current flows into resistor R14 via resistor R1. Once the current in R1 is sufficient to produce a voltage across it such that Q1B starts to bias on, then any additional current flows in the negative supply and not through R14.

Once the summing of R14 is such that the transistor Q5B starts to be biased, drive from transistor Q6 is pulled away via the base-emitter junction of transistor Q5A. In this way, the current is limited through transistor Q6 and hence the motor current is limited.

When transistor Q5B draws current away from the gate of transistor Q6 to control the current, transistor Q5A is turned on and diode D8 is biased via resistors R13 and R26 to provide a voltage of approximately 1.2 volts below the positive supply rail. This charges capacitor C5 and C6 through resistors R25 and R24 respectively.

In the "fold in" function, transistor Q13 is biased on and as such, capacitor C6 is prevented from charging but capacitor C5 can charge. In the "fold out" function, the reverse is true and transistor Q14 is on which prevents capacitor C5 from charging but allows capacitor C6 to charge.

When capacitor C5 charges enough, transistor Q8A will start to bias on, which will bias transistor Q8B on, which will further bias transistor Q8A on. The effect is that transistors Q8A and B snap on (as in an SCR). When this happens, the voltage reference across diode D1 is shunted and the regulated voltage falls close to zero causing the motor to be off. This state only ends when transistor Q14 is biased on to unlatch the arrangement, which happens when the function changes from "fold in" to "fold out". Resistor R27 prevents leakage currents causing false activation of the circuit.

When capacitor C6 charges enough, transistor Q11A will start to bias on which will bias Q11B on, which will further bias transistor Q11A on. The effect is that Q11A and B snap on (again, as in an SCR). When this happens, the motor is off. This state only ends when transistor Q13 is biased on to unlatch the arrangement, which happens when the function changes from "fold out" to "fold in". Resistor R28 prevents leakage currents causing false activation of the circuit.

The portion of the circuit which controls the function of the mirror in accordance with the invention includes resistors R13 and R12 which form a potential divider from the referenced voltage. Resistor R13 has a high and non-linear defined negative temperature coefficient of resistance to temperature as does resistor R8 as previously described. As the temperature increases, the voltage feeding resistor R11 increases (provided that the reference voltage is not shunted).

When this voltage is high enough to start biasing resistor Q4A on, transistor Q4B is biased on which in turn biases Q4A harder on. The result is that the circuit latches on, pulling transistor Q13 off. As previously described, when transistor Q13 is off, the control circuit assumes the "fold out" function and cannot fold the mirror in.

Resistor R29 prevents leakage current from falsely activating the circuit. Accordingly, if the unit were asked to operate (with voltage reference being unshunted) but at too high a temperature, the control circuit will be forced to an "fold out" state and will remain in that "fold out" state until the temperature reduces.

As will be obvious to the person skilled in the art, the value of resistor R13 and associated components will be chosen such as to cause transistor Q13 to turn off, and hence assume the "fold out" position, when the temperature of resistor R13 reaches a preset threshold. Accordingly, once the temperature of the circuit, and more particularly resistor R13, reaches an undesirable level, the control circuit will prevent the mirror from folding in, until the temperature has dropped to a safer level, at which time transistor Q13 will be allowed to turn on, and the control circuit will be allowed to assume the "fold in" state. The sense resistor R13 is placed adjacent to the components most needing temperature protection, typically the output transistors Q7 and Q10.

Because when transistor Q13 is on, and the circuit is in the "fold in" state, the mirror is still able to be operated, but only to cause it to be folded out. In this way, even though the temperature of the circuit and surrounding components may be too high, the mirror may still be folded out to allow the door to be opened, and the car to be driven, however, the mirror will not be allowed to be folded in until the temperature has reduced to safer levels.

This is a preferred arrangement, however, it is within the scope of the present invention to prevent any activation of the mirror fold function.

The above has been described with reference to a particular embodiment and it will be understood by the person skilled in the art that many variations and modifications may be made within the scope of the present invention.

The description of the invention is merely exemplary in nature and, thus, variations that do not depart from the gist of the invention are intended to be within the scope of the invention. Such variations are not to be regarded as a departure from the spirit and scope of the invention.

The claims defining the invention are as follows:

1. A control circuit for controlling the operation of a power fold vehicle mirror, the control circuit comprising:

a door signal line indicating a state of opening of a door of the vehicle;

a temperature sensor; and a vehicle mirror actuation control with inputs to fold out or fold in the vehicle mirror; wherein upon the temperature sensor sensing that a temperature of at least a portion of the control circuit has reached or exceeded a predetermined temperature threshold, the vehicle mirror actuation control prevents the vehicle mirror from folding in and wherein the vehicle mirror actuation control still allows the vehicle mirror to fold out, and wherein if the door signal line indicates the door is open, any input into the mirror actuation control will fold out the mirror.

2. A control circuit according to claim 1 wherein the temperature sensor is a thermistor.

3. A control circuit according to claim 2 wherein the vehicle mirror actuation control prevents said vehicle mirror from folding in until said temperature has fallen to or below a second predetermined temperature threshold.

4. A method of controlling the operation of a power fold vehicle mirror, controlled by a control circuit, the method including providing a signal of the vehicle door position, preventing the vehicle mirror from folding in if a temperature of at least a portion of the control circuit reaches or exceeds a predetermined temperature threshold and allowing the mirror to fold out regardless of the control circuit temperature exceeding predetermined temperature and wherein any control circuit user input causes the vehicle mirror to fold out when the door position is open.

5. A method according to claim 4 wherein the vehicle mirror is allowed to be folded in after the temperature falls to or below a second predetermined temperature threshold.

* * * * *